(12) United States Patent
Kang

(10) Patent No.: US 9,001,254 B2
(45) Date of Patent: Apr. 7, 2015

(54) DIGITAL PHOTOGRAPHING APPARATUS AND METHOD OF CONTROLLING THE SAME

(75) Inventor: Jae-hyun Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 13/602,506

(22) Filed: Sep. 4, 2012

(65) Prior Publication Data

US 2013/0176472 A1   Jul. 11, 2013

(30) Foreign Application Priority Data

Jan. 6, 2012  (KR) .................. 10-2012-0002037

(51) Int. Cl.
  *H04N 5/222*  (2006.01)
  *H04N 5/232*  (2006.01)
(52) U.S. Cl.
  CPC .................................... *H04N 5/232* (2013.01)
(58) Field of Classification Search
  CPC ................... H04N 5/23219; H04N 5/23293
  USPC ............ 348/333.01, 333.02, 333.05, 333.11; 396/264
  See application file for complete search history.

(56) References Cited

U.S. PATENT DOCUMENTS

| 2005/0046730 | A1* | 3/2005  | Li ............................ 348/333.12 |
| 2008/0122943 | A1* | 5/2008  | Itoh .......................... 348/222.1 |
| 2008/0240563 | A1* | 10/2008 | Takano et al. ................. 382/173 |
| 2010/0220220 | A1* | 9/2010  | Park et al. .................. 348/240.2 |

FOREIGN PATENT DOCUMENTS

JP   2008-136035 A   6/2008

* cited by examiner

*Primary Examiner* — Timothy J Henn
(74) *Attorney, Agent, or Firm* — Drinker Biddle & Reath LLP

(57) ABSTRACT

A digital photographing apparatus is provided that enlarges and displays one area of a subject to be photographed for a self-timer photographing standby time, as is a method of controlling the digital photographing apparatus. The method includes: receiving a self-timer photographing input signal; enlarging and displaying one area of a displayed input image for a self-timer photographing standby time; and capturing the displayed input image after the self-timer photographing standby time elapses. The area of the subject to be photographed is enlarged and displayed for the self-timer photographing standby time so that a photographing state of the subject to be photographed may be checked and a desired image may be captured.

17 Claims, 16 Drawing Sheets

FIG. 10A-1   FIG. 10A-2
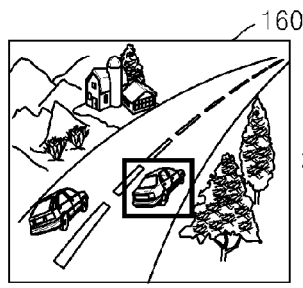 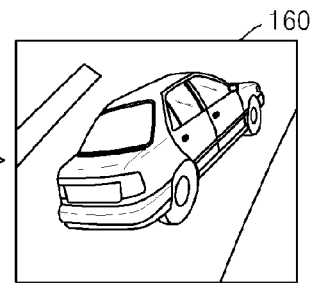
FIG. 10B-1   FIG. 10B-2   FIG. 10B-3
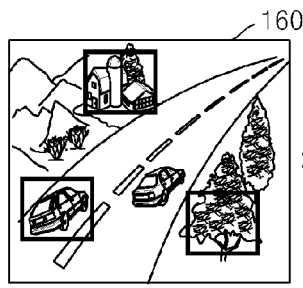 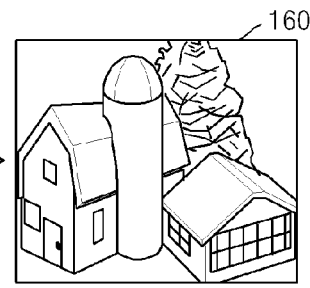 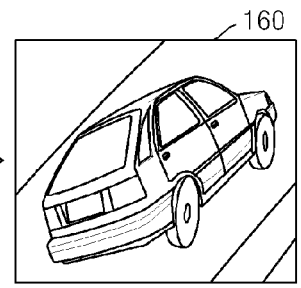
FIG. 10B-4   FIG. 10B-5
 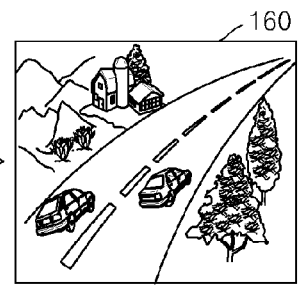

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2012-0002037, filed on Jan. 6, 2012, in the Korean Intellectual Property Office, the disclosure of which is incorporated herein in its entirety by reference.

BACKGROUND

Disclosed herein is a digital photographing apparatus and a method of controlling the same.

Most digital photographing apparatuses provide a self-timer function via which a user captures an image. Generally, when capturing an image by using the self-timer, the user sets a self-timer operating time and presses a photographing button and then moves to a place where a photographing operation is to be performed. If the set time elapses, a digital photographing apparatus performs the photographing operation by itself. However, a digital photographing apparatus cannot itself check a photographing situation of a subject to be photographed far from the digital photographing apparatus by using the using the self-timer.

SUMMARY

Various embodiments of the invention provide a digital photographing apparatus that enlarges and displays one area of a subject to be photographed for a self-timer photographing standby time, and a method of controlling the digital photographing apparatus.

According to an embodiment of the invention, there is provided a method of controlling a digital photographing apparatus, the method including: receiving a self-timer photographing input signal; enlarging and displaying one area of a displayed input image for a self-timer photographing standby time; and capturing the displayed input image after the self-timer photographing standby time elapses.

The input image may be displayed to face a subject to be photographed.

The enlarging and displaying may include enlarging and displaying a face area recognized in the input image.

The enlarging and displaying may include: detecting at least two face areas from the input image; and enlarging the at least two detected face areas and sequentially displaying the enlarged face areas at predetermined time intervals.

The enlarging and displaying may further include, after the detecting the at least two face areas, setting priorities for enlargement and display to the detected face areas.

The setting priorities may include: setting a face of a first state as a first priority; setting a face, of which a part deviates from a display region, as a second priority; and setting a face of a third state as a third priority.

The setting priorities may further include maintaining a current enlarged image until the face of the first state changes into a face of a second state, and if the face of the first state changes into the face of the second state, enlarging and displaying a next face.

The setting priorities may further include maintaining a current enlarged image until a whole face, of which a part deviates from the display region, is included in the display region, and if the whole face, of which a part deviates from the display region, is included in the display region, enlarging and displaying a next face.

If the enlarging and displaying the at least two detected face areas is completed, the enlarging and displaying may further include displaying a whole image to be captured by using a self-timer and repeatedly performing the enlarging and displaying.

The enlarging and displaying may include enlarging and displaying an auto-focusing (AF) area in the input image.

The enlarging and displaying may include enlarging and displaying an already-registered subject in the input image.

The enlarging and displaying may include enlarging and displaying a set area of the input image defined by the user.

The method may further include, after the capturing the displayed input image, displaying a self-timer photographing result.

According to another embodiment of the invention, there is provided a digital photographing apparatus including: an imaging device for receiving light from a subject to be photographed and generating an input image; a display unit for displaying the input image; and a digital signal processor (DSP) for enlarging and displaying one area of the input image displayed on the display unit for a self-timer photographing standby time when a self-timer photographing input signal is received, and capturing the displayed input image if the self-timer photographing standby time elapses.

The display unit may be disposed to face the subject to be photographed.

The DSP may enlarge and display a face area recognized in the input image.

The DSP may enlarge and display an auto-focusing (AF) area of the input image.

The DSP may enlarge and display an already-registered subject in the input image.

The DSP may enlarge and display a set area of the input image defined by the user.

The DSP may include: a timer for counting the self-timer photographing standby time; an area setting unit for setting an arbitrary area of the displayed input image; an enlargement unit for enlarging the set area; and a control unit for sequentially displaying the enlarged area.

BRIEF DESCRIPTION OF THE DRAWINGS

The above and other features and advantages of the invention will become more apparent by describing in detail exemplary embodiments thereof with reference to the attached drawings in which:

FIGS. 8 through 12 are pictorial diagrams that illustrate image enlargement of set areas when self-timer photographing is performed.

DETAILED DESCRIPTION

Figure 1:
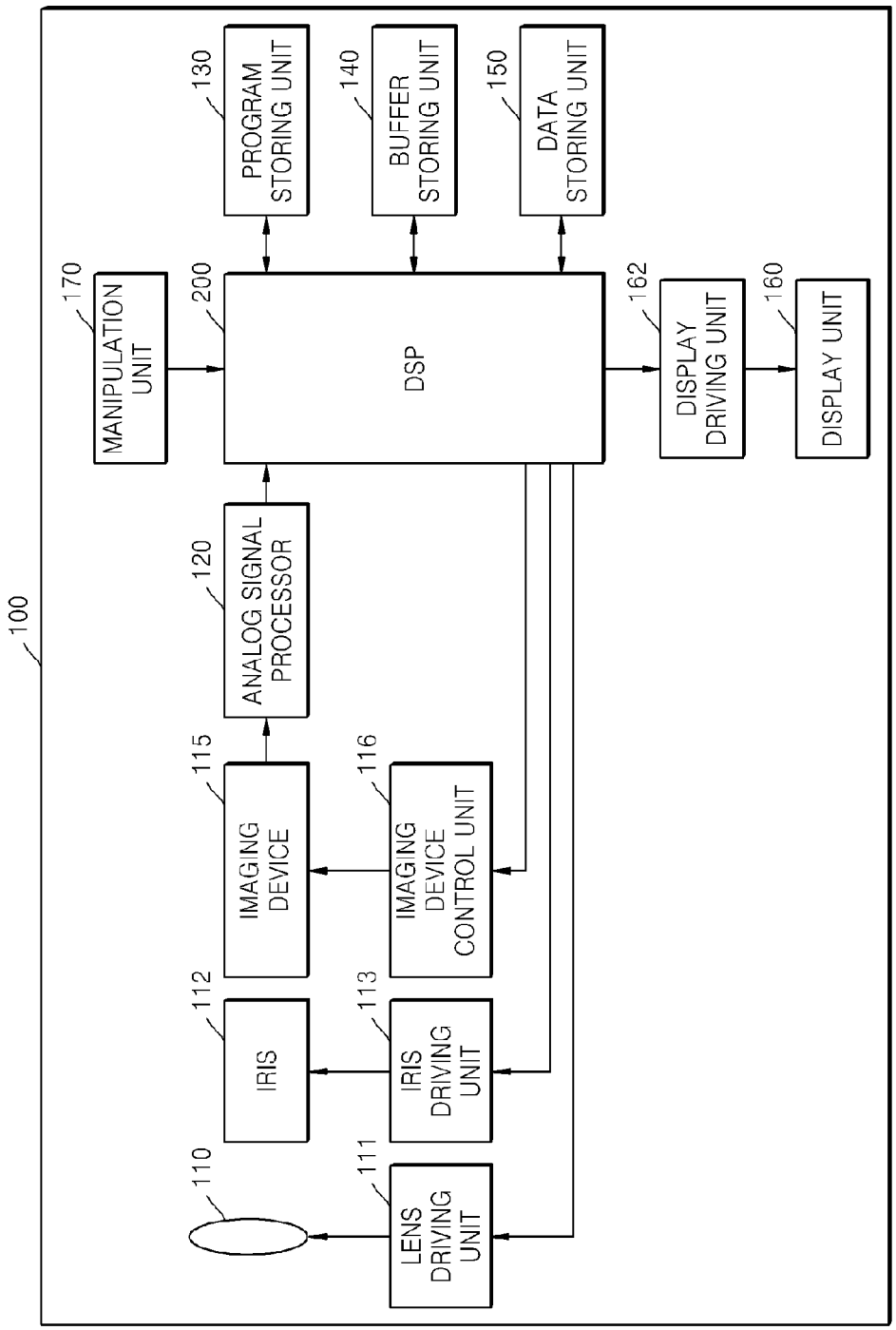
FIG. 1 is a schematic block diagram of a digital camera as an example of a digital photographing apparatus according to an embodiment of the invention.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The invention will be described below in more detail with reference to the accompanying drawings, in which exemplary embodiments of the invention are shown. Those components that are the same or are in correspondence are rendered the same reference numeral regardless of the figure number, and redundant explanations are omitted.

FIG. 1 is a block diagram of a schematic structure of a digital camera 100 as an example of a digital photographing apparatus according to an embodiment of the invention.

The digital camera 100 is described as an example of the digital photographing apparatus according to an embodiment of the invention. However, the digital photographing apparatus is not limited to the digital camera 100 illustrated in FIG. 1, and may also be applied to a digital device, such as a smart phone including a camera module, a mobile phone, a personal digital assistant (PDA), a portable multimedia player (PMP), a camcorder, or the like.

The digital camera 100 according to the present embodiment may include a lens unit 110, a lens driving unit 111, an iris 112, an iris driving unit 113, an imaging device 115, an imaging device control unit 116, an analog signal processor 120, a program storing unit 130, a buffer storing unit 140, a data storing unit 150, a display driving unit 162, a display unit 160, a digital signal processor (DSP) 200, and a manipulation unit 170. Herein, the lens unit 110, the lens driving unit 111, the iris 112, the iris driving unit 113, the imaging device 115, the imaging device control unit 116, and the analog signal processor 120 may be collectively referred to as a photographing unit.

The lens unit 110 collects a light signal. The lens unit 110 includes a zoom lens for reducing or increasing a viewing angle according to a focal length and a focus lens for adjusting the focus on a subject, and each of the zoom lens and the focus lens may be a single lens or a group of a plurality of lenses. The iris 112 regulates the light intensity of an incident light by controlling the amount of opening/closing thereof. Herein, the zoom lens may include a plurality of lens groups having positive and negative refractive powers. For example, the zoom lens may include a first lens group having a positive refractive power, a second lens group having a negative refractive power, a third lens group having a positive refractive power, and a fourth lens group having a positive refractive power in this order from an object side to an image side. Thus, the viewing angle may be changed by adjusting the position of each lens group according to driving control of the lens driving unit 111. That is, by controlling the lens driving unit 111, a zoom-in operation may be performed by moving the zoom lens from a wide angle position to a telephoto position, or a zoom-out operation may be performed by moving the zoom lens from the telephoto position to the wide angle position.

The lens driving unit 111 and the iris driving unit 113 are provided with a control signal from the DSP 200 to drive the lens unit 110 and the iris 112. The lens driving unit 111 controls the position of a lens to adjust a focal length, and performs auto-focusing, zooming, focusing operations, and so forth. The iris driving unit 113 controls the amount of opening/closing of the iris 112, and in particular, adjusts an f-number or an iris value to perform auto-focusing, auto-exposure correction, focusing, depth-of-field (DOF) adjusting operations, and the like.

The light signal passing through the lens unit 110 forms an image of a subject on a light-receiving surface of the imaging device 115. The imaging device 115 may be a charge-coupled device (CCD), a complementary metal-oxide semiconductor image sensor (CIS), or a high-speed image sensor which converts the light signal into an electric signal. The sensitivity of the imaging device 115 may be controlled by the imaging device control unit 116. The imaging device control unit 116 may control the imaging device 115 according to a control signal, which is automatically generated by an image signal input in real time or manually input by user manipulation. The exposure time of the imaging device 115 is controlled by a shutter (not shown). The shutter may be a mechanical shutter for adjusting an incidence of light by moving a shade or an electronic shutter for controlling exposure by supplying an electric signal.

The digital camera 100 also includes the display unit 160 for displaying an operational state of the digital camera 100 or still image data or moving image data obtained by the digital camera 100. The display unit 160 may provide visual information and/or audible information to the user. To provide visual information, the display unit 160 may include, for example, a liquid crystal display (LCD) or an organic light-emitting diode (OLED) display. The display driving unit 162 provides a drive signal to the display unit 160.

Figure 7A:
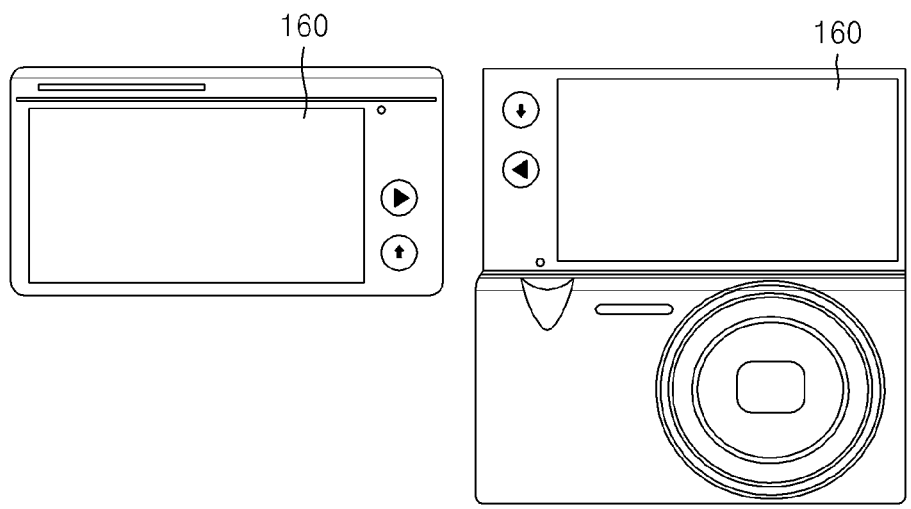
FIGS. 7A and 7B are plan views of a display screen of the digital camera illustrated in FIG. 1.
Figure 7B:
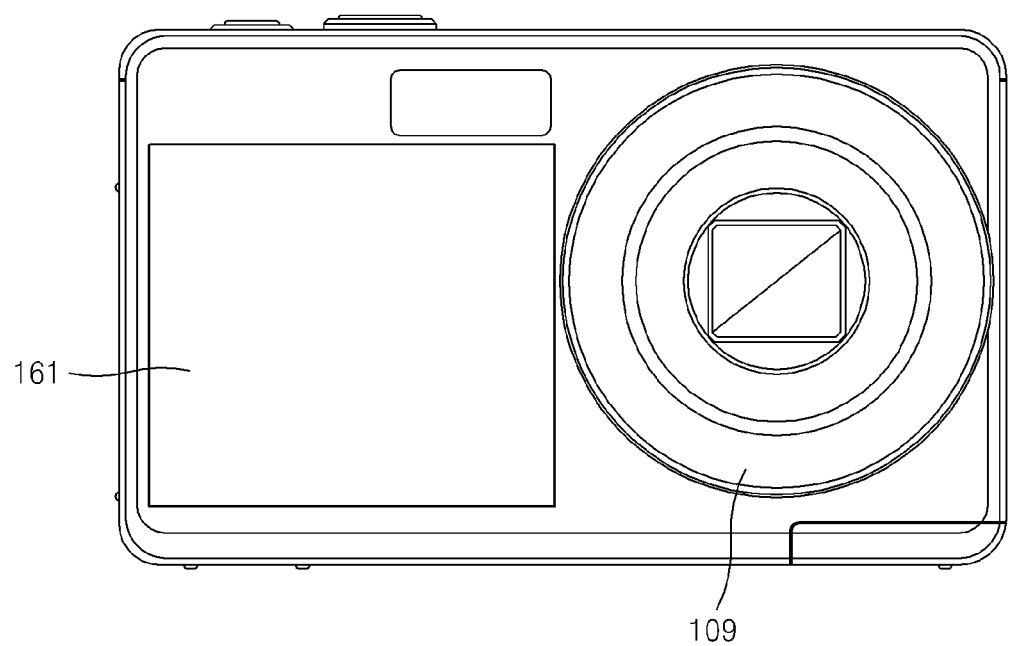

In one embodiment of the invention, the display unit 160 may be disposed to face a subject to be photographed. For example, the display unit 160 may be disposed at a rear side of the digital camera 100, may be flipped in an upward direction of the digital camera 100 to a front side of the digital camera 100 to face the subject to be photographed. FIGS. 7A and 7B are perspective views of a display screen of the digital camera 100 illustrated in FIG. 1. FIG. 7A illustrates the digital camera 100 of FIG. 1 configured so that the display unit 160 may be flipped, according to an embodiment of the invention. As shown on the left side of FIG. 7A, the display unit 160 is disposed at the rear side of the digital camera 100, is flipped upwards by user manipulation. Thus, the display unit 160 is configured to face the subject to be photographed. When the display unit 160 is flipped in the upward direction of the digital camera 100, as illustrated in FIG. 7A, the display unit 160 is inverted with respect to an image captured by the imaging device 115 due to a mirror effect. That is, the image captured by the imaging device 115 is not changed; however, a preview image and a quick view image are inverted. In addition, when the display unit 160 is not flipped, an image input by the display unit 160 and the image captured by the imaging device 115 are the same.

Referring to FIG. 7B, a display unit according to another embodiment of the invention may include a first display unit (not shown) and a second display unit 161, which are disposed at rear and front sides of the digital camera 100 of FIG. 1, respectively. As illustrated in FIG. 7B, the first display unit may be disposed on an opposite plane to a plane where a lens barrel 109 is disposed, and the second display unit 161 may be disposed on the same plane where the lens barrel 109 is disposed. Hereinafter, the display unit 160 of FIG. 7A and the second display unit 161 of FIG. 7B, which are disposed to face the subject, are referred to as the display unit 160.

The analog signal processor 120 performs noise reduction processing, gain control, waveform standardization, analog-to-digital conversion, and the like on an analog signal provided from the imaging device 115.

The manipulation unit 170 is a user interface that allows an external control signal from a user, etc., to be input. The manipulation unit 170 includes a shutter-release button for inputting a shutter-release signal which exposes the imaging device 115 to light for a predetermined time to photograph the subject, a moving image recording button for inputting a moving image record start signal and a moving image record end signal to capture a moving image, a power button for inputting a control signal for controlling power-on/off, a wide-angle zoom button and a telephoto zoom button for increasing or reducing an angle of view, respectively, and other function buttons for mode selection, such as a text input mode, a photographing mode, a play mode, and the like, a white balance setting function, an exposure setting function, and so forth. The manipulation unit 170 may be implemented with, without being limited to, various buttons as described above, but may also be implemented in any form of user input, such as a keyboard, a touch pad, a touch screen, a remote control, or the like.

The digital camera 100 may include the program storing unit 130 for storing programs of an operating system and an application system of the digital camera 100, the buffer storing unit 140 for temporarily storing data required during an operation or storing result data, and the data storing unit 150 for storing data for programs, such as an image file corresponding to an image signal and a moving image file.

The digital camera 100 also includes the DSP 200 for processing an input image signal and controlling components of the digital camera 100 according to the input image signal or an externally input signal. The DSP 200 may perform image signal processing for quality improvement, such as noise reduction, gamma correction, color filter array interpolation, color matrix, color correction, and color enhancement, on input image data. The DSP 200 also may compress the image data generated by performing image signal processing for quality improvement to generate an image file, or may restore the image data from the image file. An image compression format may be a reversible format or an irreversible format. The compressed data may be stored in the data storing unit 150. The DSP 200 may also functionally perform indistinctness processing, color processing, blur processing, edge emphasis processing, image interpretation processing, image recognition processing, image effect processing, and the like. The image recognition processing may include face recognition and scene recognition. For example, luminance level adjustment, color correction, contrast adjustment, contour emphasis adjustment, screen dividing processing, image generation and synthesis processing, and the like may be performed.

In addition, the DSP 200 may execute a program stored in the program storing unit 130 or include a separate module to generate a control signal for controlling auto-focusing, zooming, focus changing, and auto-exposure correction operations, provide the control signal to the lens driving unit 111, the iris driving unit 113, and the imaging device control unit 116, and collectively control operations of components included in the digital camera 100, such as a shutter, a flash, and the like.

Figure 2:
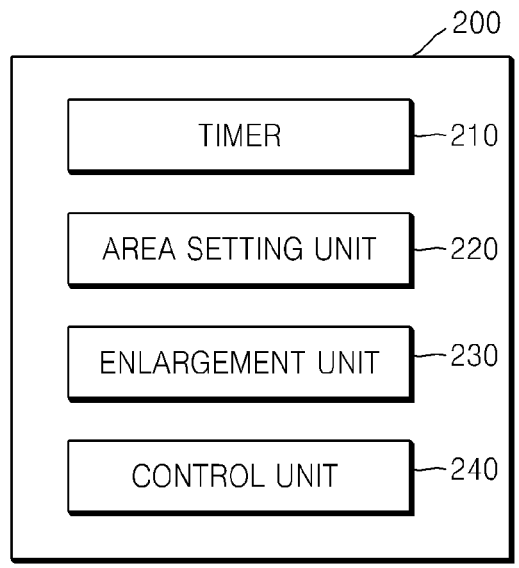
FIG. 2 is a schematic block diagram of a digital signal processor (DSP) illustrated in FIG. 1, according to an embodiment of the invention.

FIG. 2 is a schematic block diagram of the DSP 200 illustrated in FIG. 1, according to an embodiment of the invention;

Referring to FIG. 2, the DSP 200 may include a timer 210, an area setting unit 220, an enlargement unit 230, and a control unit 240.

The DSP 200 according to the present embodiment enlarges one area of an input image displayed for a self-timer photographing standby time and displays the area on the display unit 160 when a self-timer photographing input signal is received, and after the self-timer photographing standby time elapses, the DSP 200 captures the displayed input image. Here, the input image refers to a live view image or a preview image before the subject is photographed.

The timer 210 counts a time set in a self-timer photographing mode. If a user selects a self-timer photographing mode menu by using the manipulation unit 170, the control unit 240 displays a time setting menu (not shown) on the display unit 160. The user sets a self-timer time, for example, 10 seconds, by selecting the time setting menu (not shown). If the user presses a shutter-release button for self-timer photographing, the timer 210 counts the set time, and if counting of the set time of the timer is completed, the control unit 240 controls elements of the DSP 200 so that self-timer photographing may be performed.

The area setting unit 220 sets an arbitrary area to be displayed on the display unit 160 for a self-timer photographing standby time (10 seconds). When a subject to be photographed using a self-timer is a person, the area setting unit 220 may set a face of the person as an area to be separately displayed on the display unit 160, and when a subject to be photographed using a self-timer is a landscape, the area setting unit 220 may set an auto-focusing (AF) area as the area to be separately displayed on the display unit 160, and when the subject to be photographed using a self-timer is an already-registered subject, the area setting unit 220 may set the subject as the area to be separately displayed on the display unit 160, and when the user sets an arbitrary area, the area setting unit 220 may set the area set by the user as the area to be separately displayed on the display unit 160. In addition, the area setting unit 220 may set a variety of number of areas. Setting a variety of number of areas by using the area setting unit 220 is described below with reference to FIGS. 3 through 6.

The enlargement unit 230 enlarges at least one arbitrary area set for the self-timer photographing standby time.

The control unit 240 displays the area enlarged for the self-timer photographing standby time on the display unit 160, and if the self-timer photographing standby time elapses, the control unit 240 performs self-timer photographing. If self-timer photographing is completed, the control unit 240 displays a photographing result on the display unit 160 so that the user can check the image. Thus, when the subject to be photographed is a person, a composition of the subject to be photographed may change, or an expression of the person as the subject to be photographed may change while the display unit 160 displays to face the subject to be photographed.

Figure 3:
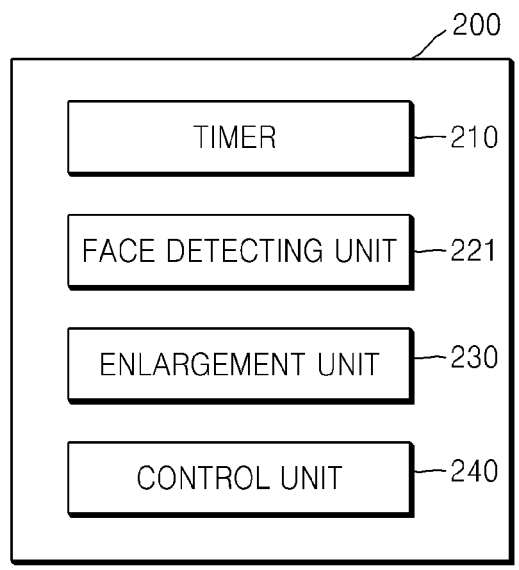
FIG. 3 is a schematic block diagram of the DSP illustrated in FIG. 1, according to another embodiment of the invention.

FIG. 3 is a schematic block diagram of the DSP 200 illustrated in FIG. 1, according to another embodiment of the invention;

Referring to FIG. 3, the DSP 200 detects a face in an input image displayed for a self-timer photographing standby time, enlarges an image of the detected face and displays the image on the display unit 160 when a self-timer photographing input signal is received, and after the self-timer photographing standby time elapses, the DSP 200 captures the displayed input image. The DSP 200 may include a timer 210, a face detecting unit 221, an enlargement unit 230, and a control unit 240. Hereinafter, repeated descriptions with reference to FIG. 2 are omitted.

The timer 210 counts a set time when the self-timer photographing input signal is received.

The face detecting unit 221 detects at least one face in the input image and calculates a face detection coordinate. The face detecting unit 221 finds unchangeable features of the face, such as face elements, for example, the eyes, nose, and mouth, skin texture, and skin color by using a feature-based face detecting method and calculates a feature point coordinate of the face. In particular, among several features of the face, skin color is less sensitive to movement, rotation, size change of the face, etc., and thus, is most widely used. The face detecting unit 221 also uses a template-based detecting method whereby several standard patterns of the face are made and stored for face detection. In the template-based detecting method, after the patterns are stored for face detection, each of the patterns is compared with an image in a search window so that the face may be detected. Recently, another support vector machine (SVM)-based face detecting method has been widely used. In the SVM-based face detecting method, different areas are sub-sampled from an input image, and a face portion and a non-face portion are learned by a learning device so that the face may be detected from the input image. Face information detection by the face detecting unit 221 is well-known and thus a detailed explanation thereof is omitted.

The face detecting unit 221 may include a database 53 in which smile detection information, blinking eyes detection information, and the like are stored. The face detecting unit 221 may detect whether the detected face smiles or the eyes of the detected face blink, by comparing the detected face with the smile detection information and the blinking eyes detection information stored in the database. A first state of a face recited in the following claims may be a grimace state or a blinking eyes state, and a second state of the face recited therein may be a smile state or a non-blinking eyes state.

The enlargement unit 230 enlarges at least one detected face.

The control unit 240 displays the face areas enlarged for the self-timer photographing standby time on the display unit 160, and if the self-timer photographing standby time elapses, the control unit 240 performs self-timer photographing. If self-timer photographing is completed, the control unit 240 displays a photographing result on the display unit 160 so that the user can check the image.

The control unit 240 displays the face areas enlarged according to a set time for the self-timer photographing standby time from among a plurality of faces sequentially on the display unit 160, and if the self-timer photographing standby time elapses, the control unit 240 performs self-timer photographing.

Figure 8:
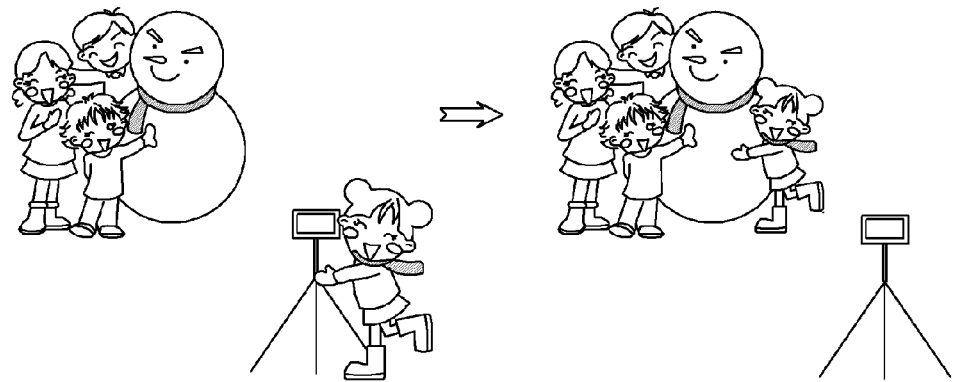
Figure 8A:
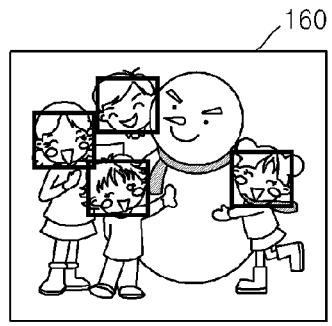
Figure 8B:
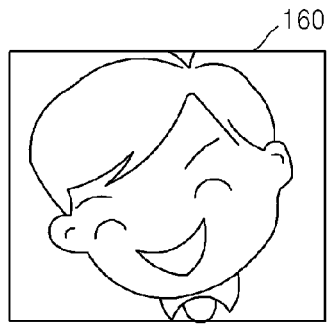
Figure 8C:
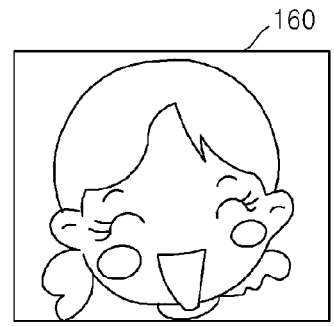
Figure 8D:
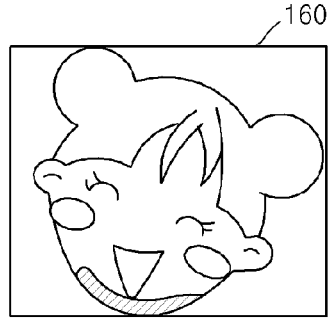
Figure 8E:
Figure 8F:
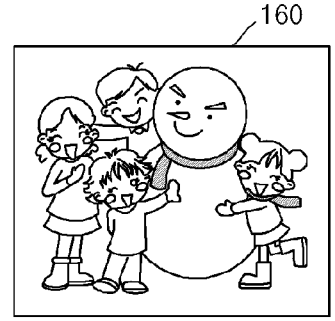

FIGS. 8A through 8F illustrate display of areas enlarged for a self-timer photographing standby time, which is detected from a plurality of faces during self-timer photographing. FIG. 8A illustrates a plurality of face areas detected from an input image. FIGS. 8B through 8E illustrate sequential display of enlarged faces that were detected, for a predetermined set time, for example, 1 second. FIG. 8F illustrates repeated display of the whole input image to be captured, if display of the enlarged face areas is completed. The displays illustrated in FIGS. 8B through 8F are repeated on the display unit 160 for the self-timer photographing standby time.

The control unit 240 displays the face areas enlarged according to the set time for the self-timer photographing standby time sequentially on the display unit 160 by setting priorities to a plurality of faces, and if the self-timer photographing standby time elapses, the control unit 240 performs self-timer photographing. Here, a first priority may be a face of a first state, i.e., a grimace state or a blinking eyes state, and a second priority may be a face that deviates from a display region, and a third priority may be a normal face expression. When enlarging and displaying a face having the first priority, the control unit 240 maintains a current enlarged face until the face of the first state becomes a second state, i.e., a smile state or non-blinking eyes state, and if the face of the first state changes into the second state, the next face is enlarged and displayed. In addition, when enlarging and displaying a face having the second priority, the control unit 240 maintains the current enlarged face until the face is included in the display region, and if the face is included in the display region, the control unit 240 enlarges and displays the next face.

Figure 9A:
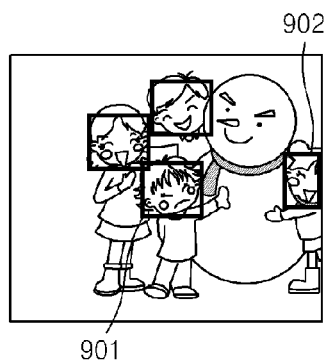
Figures 1, 9B:
Figures 2, 9B:
Figures 1, 9C:
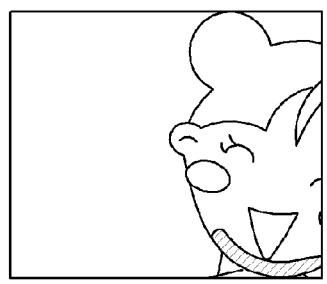
Figures 2, 9C:
Figure 9D:
Figure 9E:
Figure 9F:
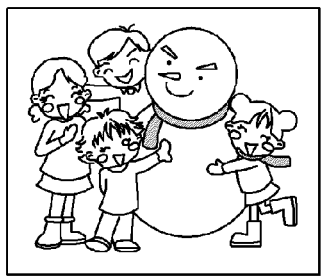

FIGS. 9A through 9F illustrate setting priorities to a plurality of faces detected during self-timer photographing and display of areas enlarged for a self-timer photographing standby time. FIG. 9A illustrates a plurality of face areas detected from an input image. A face 901 of a first state and a face 902 that deviates from the display region are included in FIG. 9A. FIG. 9B-1 illustrates an example in which the face 901 having a first priority, i.e., the face 901 of the first state is enlarged and displayed, and FIG. 9B-2 illustrates an example in which the face 901 of the first state changes into a second state. A screen of FIG. 9B-1 is maintained until the face 901 of the first state changes into the second state, and if the face 901 of the first state changes into the second state, the screen of FIG. 9B is converted into FIG. 9C-1. FIG. 9C-1 illustrates an example in which a face having a second priority, i.e., a face 902, of which a part deviates from the display region is enlarged and displayed, and FIG. 9C-2 illustrates an example in which the whole face 902, of which a part deviates from the display region, is changed to be included in the display region. The screen of FIG. 9C-1 is maintained until the face 902, of which a part deviates from the display region, is changed to be included in the display region, and if the face is changed to be included in the display region, the screen of FIG. 9C-2 is converted into FIG. 9D. FIGS. 9D and 9E illustrate sequential display of a face having a third priority, i.e., a face of a third state as a normal face expression enlarged for a predetermined set time. Here, the face of the third state may be maintained in a smile state and may be included in the display region. FIG. 9F illustrates repeated display of the whole input image to be captured if display of the enlarged face areas is completed. The displays illustrated in FIGS. 9B through 9F are repeated on the display unit 160 for the self-timer photographing standby time.

Figure 4:
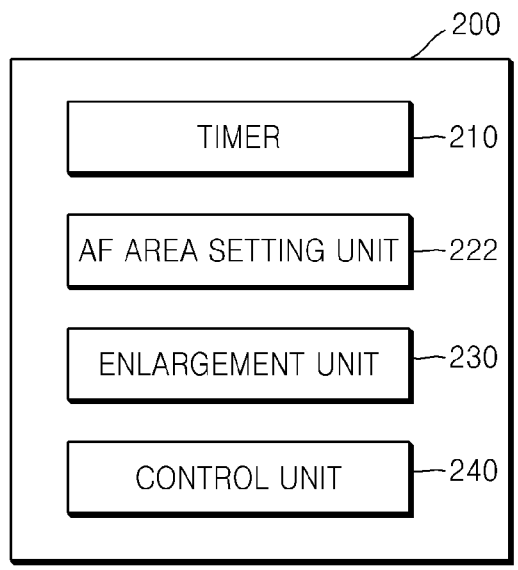
FIG. 4 is a schematic block diagram of the DSP illustrated in FIG. 1, according to another embodiment of the invention.

FIG. 4 is a schematic block diagram of the DSP 200 illustrated in FIG. 1, according to another embodiment of the invention;

Referring to FIG. 4, when a self-timer photographing input signal is received, the DSP 200 sets an AF area of an input image displayed for a self-timer photographing standby time, enlarges the set AF area and displays the enlarged AF area on the display unit 160, and if the self-timer photographing standby time elapses, the DSP 200 captures the displayed input image. The DSP 200 may include a timer 210, an AF area setting unit 222, an enlargement unit 230, and a control unit 240. Hereinafter, repeated descriptions with respect to FIGS. 2 and 3 are omitted.

The timer 210 counts a set time when the self-timer photographing input signal is received.

The AF area setting unit 222 sets at least one AF area in the input image. There are some AF area setting methods whereby an AF area may be set to include the right center of the input image or the input image may be divided into a plurality of predetermined areas in order to set a plurality of AF areas.

The enlargement unit 230 enlarges at least one set AF area.

The control unit 240 displays the AF area enlarged for the self-timer photographing standby time on the display unit 160, and if the self-timer photographing standby time elapses, self-timer photographing is performed.

FIGS. 10A-1 and 10A-2 illustrate enlargement and display of an AF area set for a self-timer photographing standby time during self-timer photographing. FIG. 10A-1 illustrates one AF area detected from the input image. FIG. 10A-2 illustrates enlargement and display of the set AF area.

In addition, the control unit 240 displays a plurality of set AF areas enlarged according to the set time for the self-timer photographing standby time sequentially on the display unit 160, and if the self-timer photographing standby time elapses, the control unit 240 performs self-timer photographing.

Figure 5:
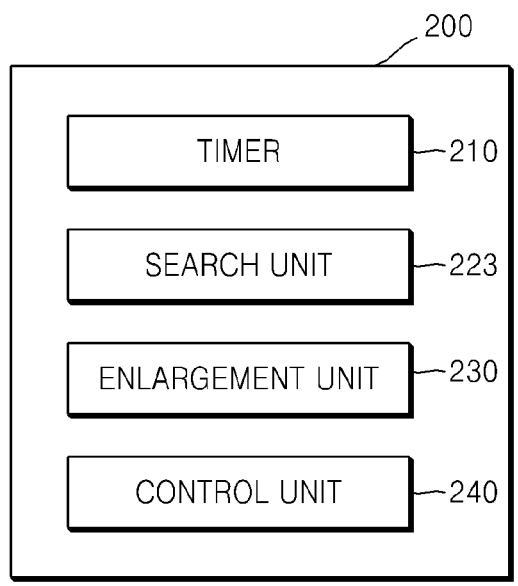
FIG. 5 is a schematic block diagram of the DSP illustrated in FIG. 1, according to another embodiment of the invention.

FIGS. 10B-1 through 10B-5 illustrate display of a plurality of AF areas that are set during self-timer photographing and enlarged for a self-timer photographing standby time. FIG. 10B-1 illustrates a plurality of AF areas set from the input image. FIG. 10B-2 through 10B-4 illustrate enlargement and sequential display of AF areas detected for a predetermined set time. FIG. 10B-5 illustrates repeated display of the whole input image to be captured if display of the enlarged AF areas is completed. The displays of FIGS. 10B-2 through 10B-5 are repeated on the display unit 160 for the self-timer photographing standby time.

FIG. 5 is a schematic block diagram of the DSP 200 illustrated in FIG. 1, according to another embodiment of the invention;

Referring to FIG. 5, when a self-timer photographing input signal is received, the DSP 200 enlarges an already-registered subject if the same subject as an already-registered subject exists in an input image displayed for a self-timer photographing standby time, and displays the enlarged subject on the display unit 160, and once the self-timer photographing standby time elapses, the DSP 200 captures the displayed input image. The DSP 200 may include a timer 210, a search unit 223, an enlargement unit 230, and a control unit 240. Hereinafter, repeated descriptions with respect to FIGS. 2 through 4 are omitted.

The timer 210 counts a set time when the self-timer photographing input signal is received.

The search unit 223 searches for whether the already-registered subject exists in the input image. The search unit 223 includes a database in which a captured image of a subject defined by the user, such as an arbitrary animal, a person, an object, and the like, is stored. The search unit 223 compares the subject to be photographed with the already-registered subject stored in the database, and if the same subject as the already-registered subject stored in the database exists, the search unit 223 outputs the subject.

The enlargement unit 230 enlarges at least one already-registered subject.

The control unit 240 enlarges the at least one already-registered subject according to the set time for the self-timer photographing standby time and displays the enlarged subject on the display unit 160, and if the self-timer photographing standby time elapses, the control unit 240 performs self-timer photographing.

Figure 11A:
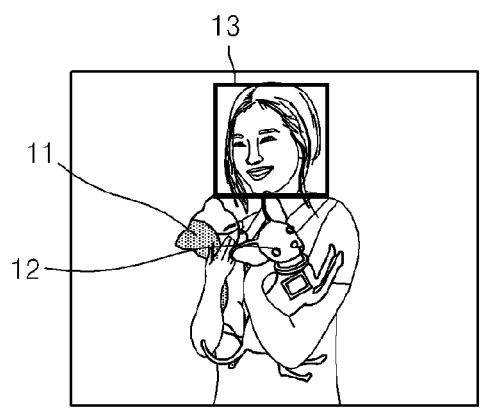
Figure 11B:
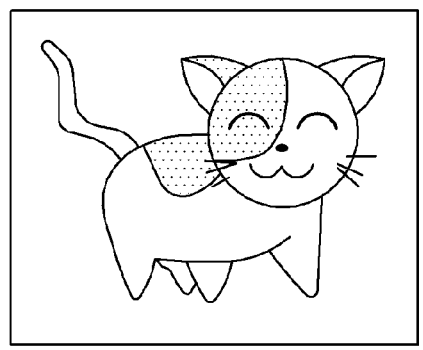
Figure 11C:
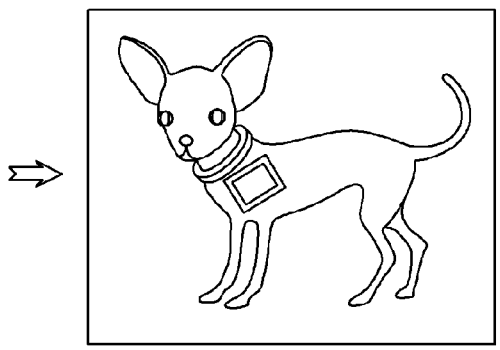
Figure 11D:
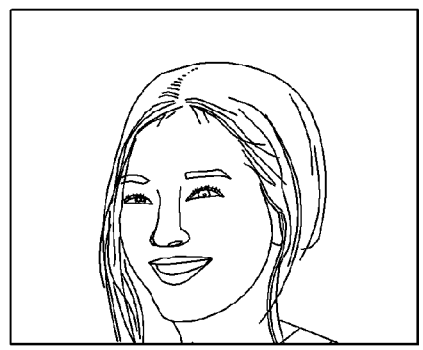
Figure 11E:
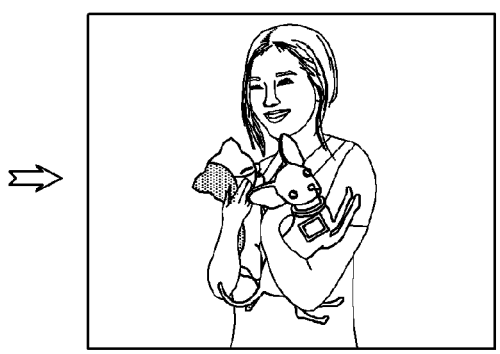

FIGS. 11A through 11E illustrate enlargement and display of an already-registered subject for a self-timer photographing standby time during self-timer photographing. FIG. 11A illustrates a face 13 of a detected person including an already-registered first subject 11 detected from the input image, for example, a dog, and an already-registered second subject 12, for example, a cat. FIGS. 11B through 11D illustrate enlargement and sequential display of the first and second subjects 11 and 12 previously registered for a predetermined set time and the face 13. FIG. 11E illustrates repeated display of the whole input image to be captured if display of the enlarged areas is completed. The displays of FIGS. 11B through 11E are repeated on the display unit 160 for the self-timer photographing standby time.

Figure 6:
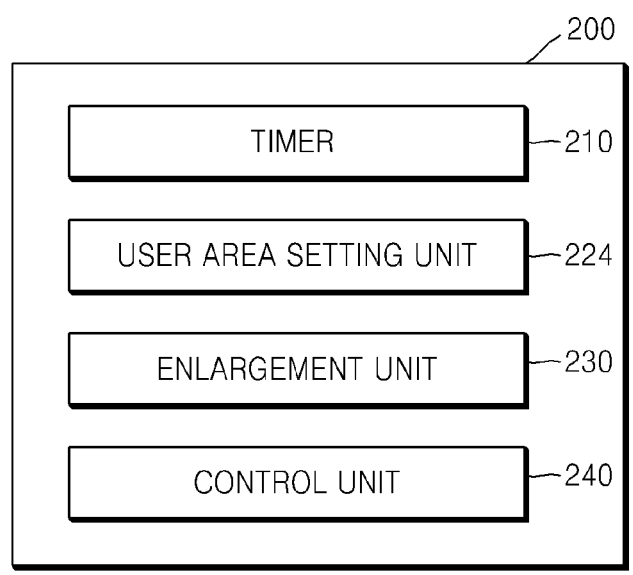
FIG. 6 is a schematic block diagram of the DSP illustrated in FIG. 1, according to another embodiment of the invention.

FIG. 6 is a schematic block diagram of the DSP 200 illustrated in FIG. 1, according to another embodiment of the invention;

Referring to FIG. 6, when a self-timer photographing input signal is received, the DSP 200 enlarges a set area defined by a user for a self-timer photographing standby time and displays the enlarged set area on the display unit 160, and if the self-timer photographing standby time elapses, the DSP 200 captures the displayed input image. The DSP 200 may include a timer 210, a user area setting unit 224, an enlargement unit 230, and a control unit 240. Hereinafter, repeated descriptions of elements that have already been described with reference to FIGS. 2 through 5 are omitted.

The timer 210 counts a set time when the self-timer photographing input signal is received.

The user area setting unit 224 receives and sets the area defined by the user in a self-timer photographing mode. The user sets at least one arbitrary area of the display unit 160 to be enlarged, and the user area setting unit 224 stores coordinates of the area set by the user.

The enlargement unit 230 recognizes the coordinates of the at least one area set by the user and enlarges the at least one area.

The control unit 240 enlarges the set area defined by the user according to a set time for the self-timer photographing standby time and displays the enlarged set area on the display unit 160, and if the self-timer photographing standby time elapses, the control unit 240 performs self-timer photographing.

Figure 12A:
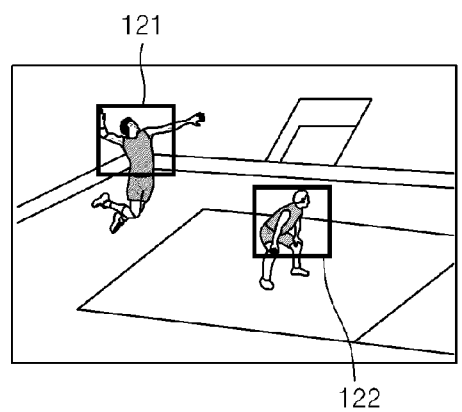
Figure 12B:
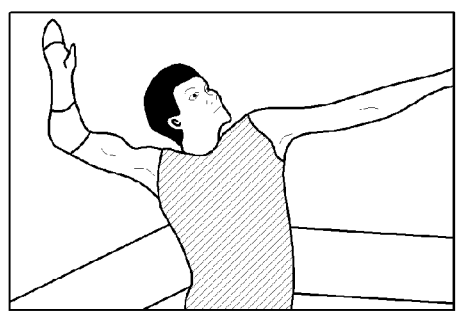
Figure 12C:
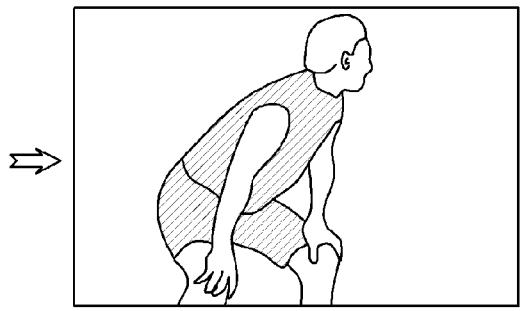
Figure 12D:
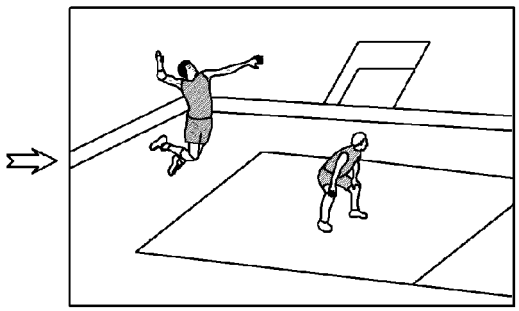

FIGS. 12A through 12D illustrate enlargement and display of an area defined by a user for a self-timer photographing standby time when photographing is performed using a self-timer. FIG. 12A illustrates a plurality of areas of an input image defined by the user. FIGS. 12B and 12C illustrate sequential display of enlarged areas 121 and 122 defined by the user for a predetermined set time. FIG. 12D illustrates repeated display of the whole input image to be captured if display of the enlarged areas 121 and 122 is completed. The displays illustrated in FIGS. 12B through 12D are repeated on the display unit 160 for the self-timer photographing standby time.

Hereinafter, a method of controlling a digital photographing apparatus, according to embodiments of the invention, will be described with reference to FIGS. 13 through 18. The method of controlling a digital photographing apparatus, according to embodiments of the invention, may be performed by elements of the digital camera 100 illustrated in FIG. 1. A main algorithm of the method of controlling a digital photographing apparatus may be performed by elements of the DSP 200 with the help of peripheral elements of the digital camera 100 according to embodiments of the invention.

Figure 13:
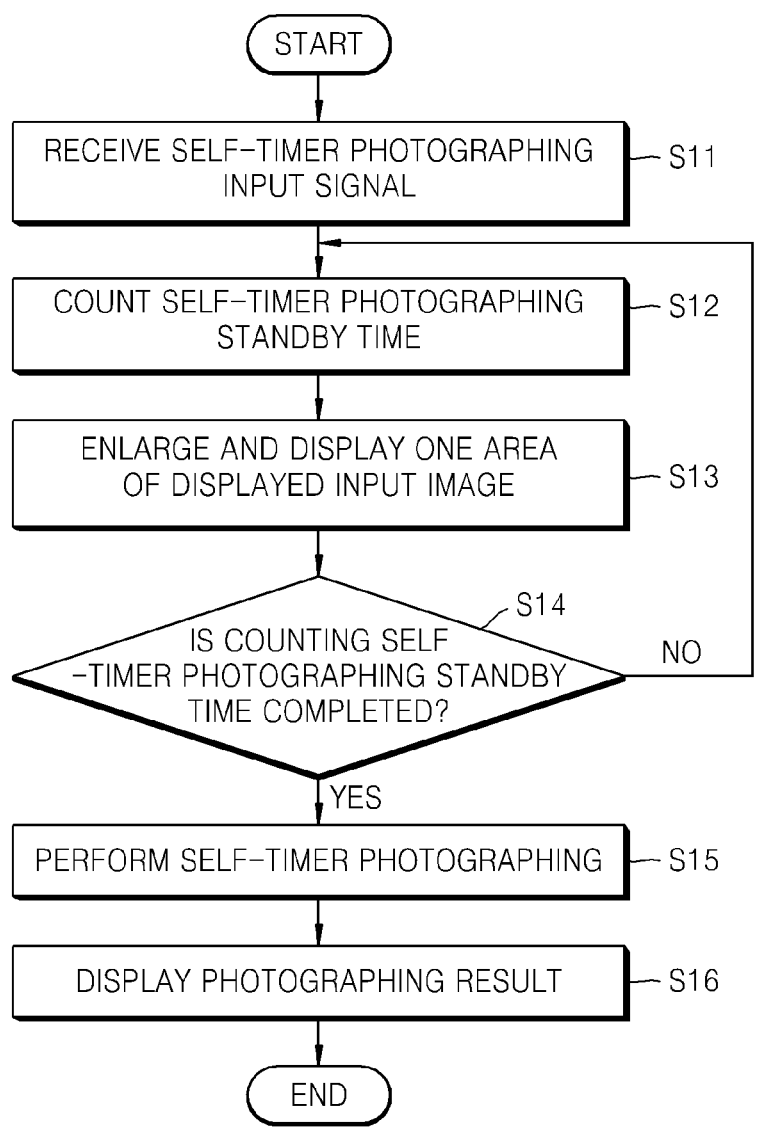
FIGS. 13 through 18 are flowcharts illustrating a method of controlling a digital photographing apparatus, according to exemplary embodiments of the invention, respectively.

FIG. 13 is a flowchart illustrating a method of controlling a digital photographing apparatus, according to an embodiment of the invention.

Referring to FIG. 13, the DSP 200 receives a self-timer photographing input signal from a user (S11). Here, self-timer photographing refers to an operation in which a user sets the digital camera 100 in a self-timer photographing mode, sets a self-timer photographing standby time, and then performs a shutter-release button input.

When the self-timer photographing input signal is received from the user, the DSP 200 counts the self-timer photographing standby time (S12).

By counting the self-timer photographing standby time, the DSP 200 enlarges and displays one area of the displayed input image (S13).

When a subject to be photographed using a self-timer is a person, the DSP 200 may detect a face of the person and may enlarge and display the detected face of the person on the display unit 160. When the subject to be photographed using a self-timer is a landscape, the DSP 200 may set an AF area and enlarge and display the set AF area on the display unit 160, and when the subject to be photographed using a self-timer is an already-registered subject, the DSP 200 may enlarge and display the already-registered subject on the display unit 160, and when the user sets an arbitrary area, the DSP 200 may enlarge and display the area set by the user on the display unit 160. In addition, the DSP 200 may set a variety of number of areas, and when a plurality of areas are set by the user, the DSP 200 displays the plurality of areas on the display unit 160 sequentially according to a predetermined time.

While enlarging and displaying, the DSP 200 determines whether counting of the self-timer photographing standby time is completed (S14).

As a result of the determination, if counting of the self-timer photographing standby time is completed, the DSP 200 performs self-timer photographing (S15) and displays a photographing result on the display unit 160 (S16).

Figure 14:
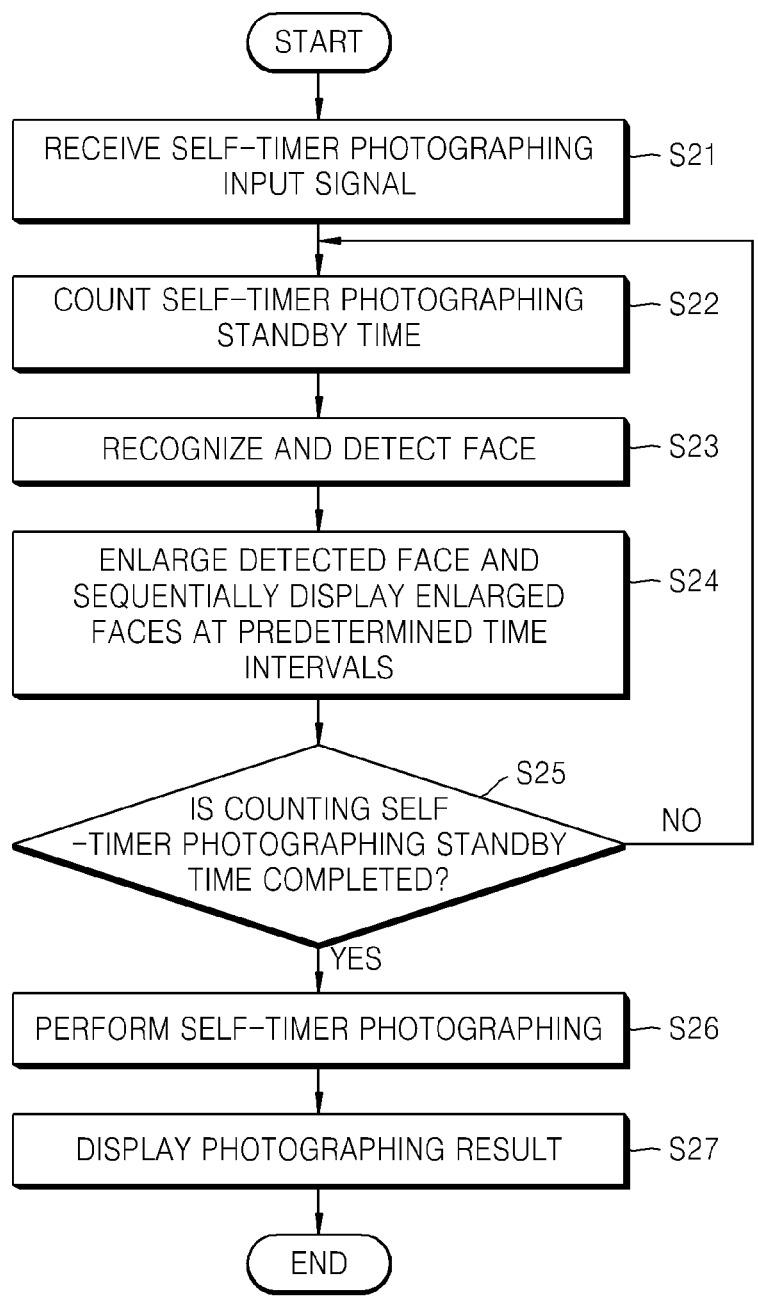

FIG. 14 is a flowchart illustrating a method of controlling a digital photographing apparatus, according to another embodiment of the invention. Hereinafter, repeated descriptions with respect to FIG. 13 are omitted.

Referring to FIG. 14, the DSP 200 receives a self-timer photographing input signal from a user (S21).

When the self-timer photographing input signal is received from the user, the DSP 200 counts a self-timer photographing standby time (S22).

By counting the self-timer photographing standby time, the DSP 200 recognizes and detects at least one face from the displayed input image (S23).

If face detection is completed, the DSP 200 enlarges the detected face and displays the enlarged faces on the display unit 160 sequentially at predetermined time intervals (S24). If enlargement and display of the detected face is completed, the DSP 200 displays the whole image to be captured and then repeatedly performs face enlargement display and display of the whole image for the self-timer photographing standby time.

While enlarging and displaying, the DSP 200 determines whether counting of the self-timer photographing standby time is completed (S25).

As a result of the determination, if the self-timer photographing standby time is completed, the DSP 200 performs self-timer photographing (S26) and displays a photographing result on the display unit 160 (S27).

Figure 15:
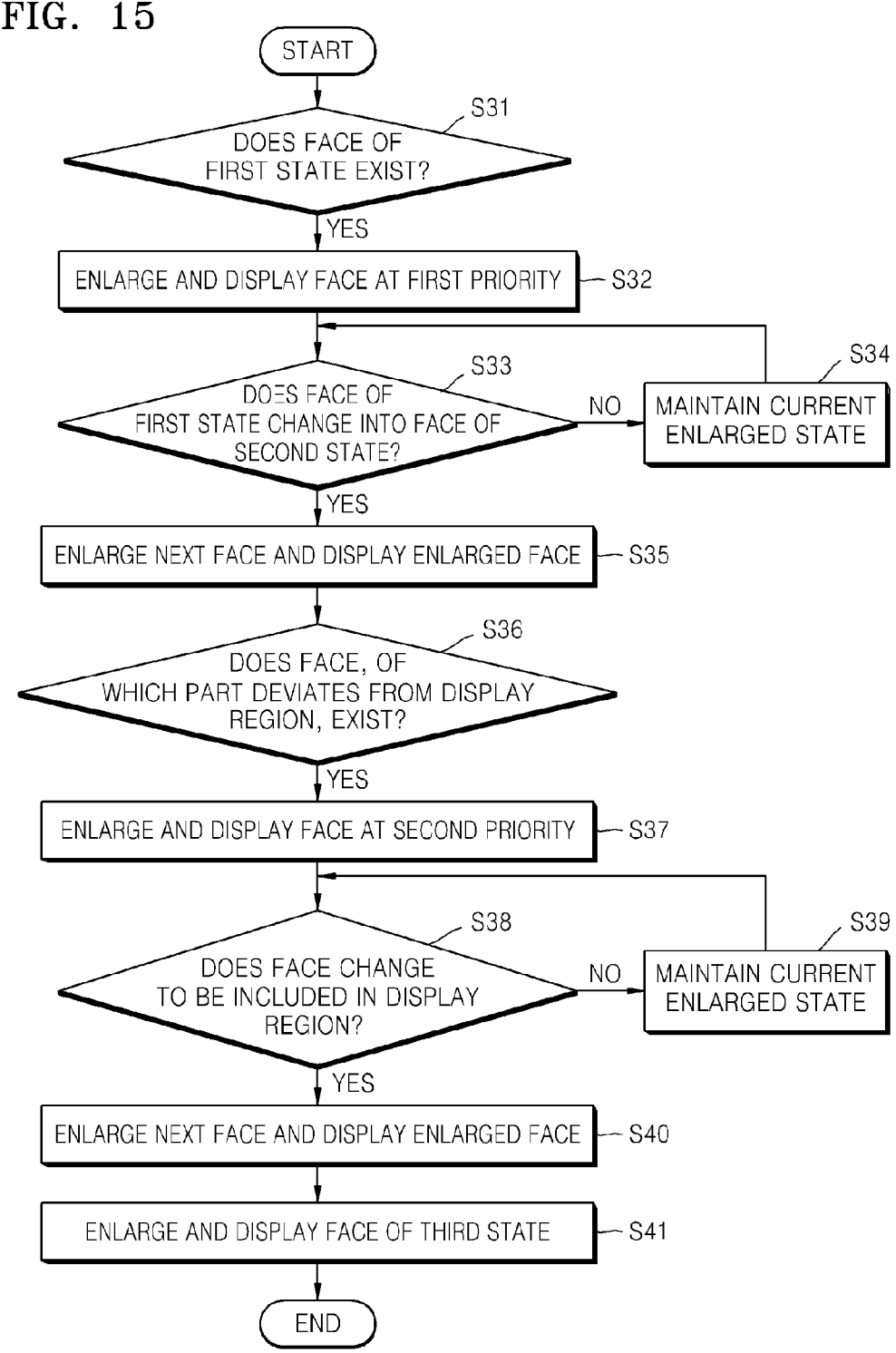

FIG. 15 is a flowchart illustrating a an operation of setting priorities to the plurality of face areas detected in FIG. 14 and enlarging and displaying the face areas.

Referring to FIG. 15, the DSP 200 determines whether a face of a first state exists in a displayed input image (S31). Here, the face of the first state may be a grimace state or a blinking eyes state.

When the face of the first state exists in the displayed input image, the DSP 200 sets the face of the first state as a first priority and enlarges and displays the set face on the display unit 160 (S32).

Next, the DSP 200 determines whether the face of the first state changes into a face of a second state (S33). Here, the face of the second state may be a smile face or a non-blinking eyes state.

When the face of the first state does not change into the face of the second state, the DSP 200 maintains the current enlarged state, i.e., the enlarged face of the first state (S34).

Otherwise, when the face of the first state changes into the face of the second state, the DSP 200 enlarges the next face and displays the enlarged face (S35).

The DSP 200 determines whether a face, of which a part deviates from a display region, exists in the displayed input image (S36).

When the face, of which a part deviates from the display region, exists in the displayed input image, the DSP 200 sets the face, of which a part deviates from the display region, as a second priority and displays the enlarged set face on the display unit 160 (S37).

Next, the DSP 200 determines whether the whole face, of which a part deviates from the display region, changes into a state included the display region (S38).

When the face, of which a part deviates from the display region, is maintained, the DSP 200 maintains the current enlarged state, i.e., the state of the enlarged face, of which a part deviates from the display region (S39).

However, when the whole face, of which a part deviates from the display region, is changed to be included in the display region, the DSP 200 enlarges the next face and displays the enlarged face (S40).

The DSP 200 sets a state of a normal face expression that is a third state of the displayed input image, as a third priority and displays the enlarged normal expression face (S41). Here, the face of the third state may be a state of the whole face smiling and included in the display region.

Figure 16:
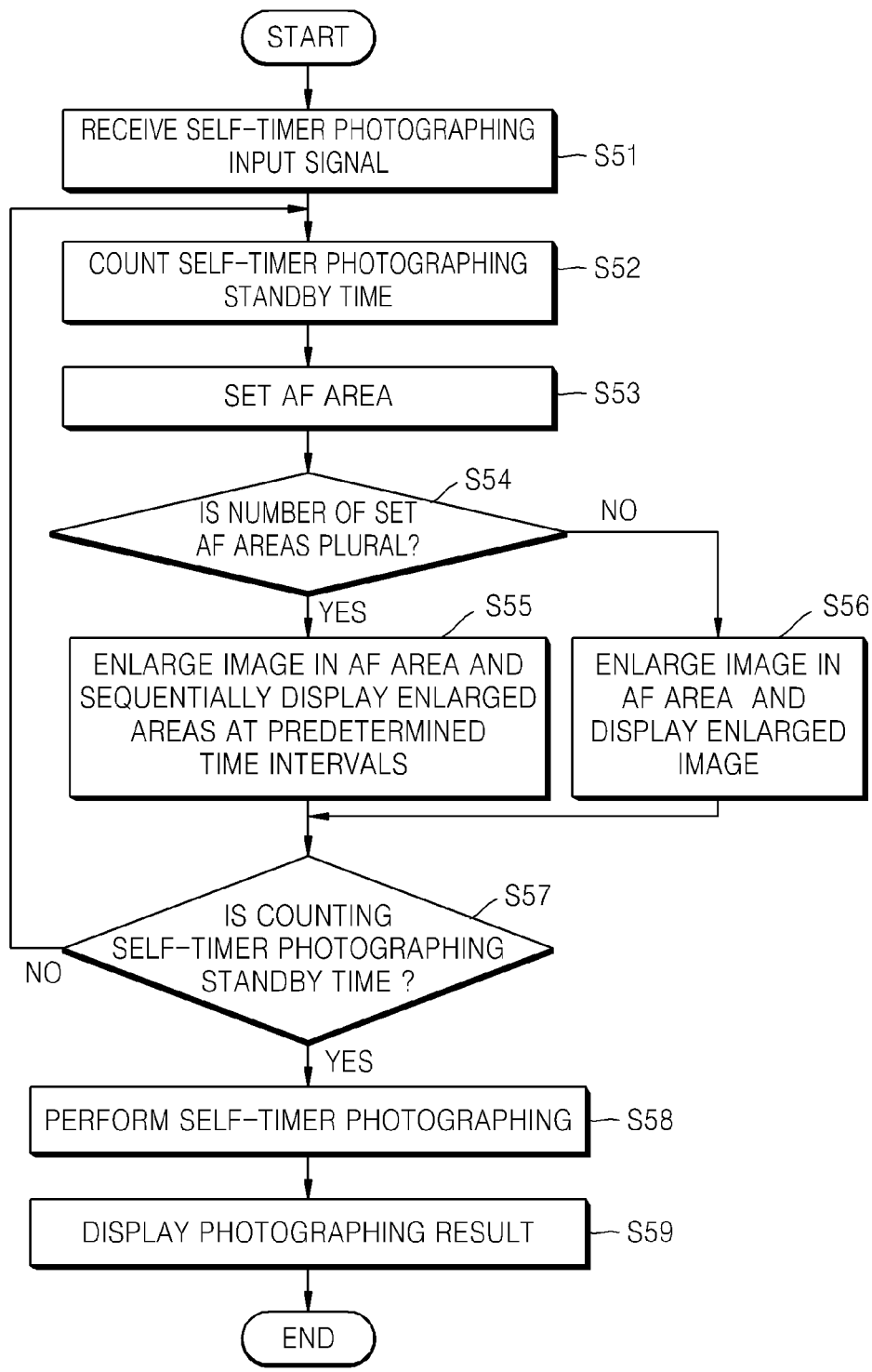

FIG. 16 is a flowchart illustrating a method of controlling a digital photographing apparatus, according to another embodiment of the invention. Hereinafter, repeated descriptions with respect to FIGS. 13 through 15 are omitted.

Referring to FIG. 16, the DSP 200 receives a self-timer photographing input signal from a user (S51).

When the self-timer photographing input signal is received from the user, the DSP 200 counts a self-timer photographing standby time (S52).

By counting the self-timer photographing standby time, the DSP 200 sets at least one AF area of the displayed input image (S53).

If setting of the at least one AF area is completed, the DSP 200 determines whether the number of detected AF areas is plural (S54).

When the number of detected AF areas is plural, the DSP 200 enlarges the image in the AF area and displays the enlarged areas on the display unit 160 sequentially at predetermined time intervals (S55). If enlargement and display of the detected AF areas is completed, the DSP 200 displays the whole image to be captured and repeatedly performs AF area enlargement and display and display of the whole image for the self-timer photographing standby time.

However, when the number of detected AF areas is one, the DSP 200 enlarges the image in the AF area and displays the enlarged image on the display unit 160 (S56). The DSP 200 performs enlargement and display of the detected AF area and display of the whole image to be captured at predetermined time intervals.

While enlarging and displaying, the DSP 200 determines whether counting of the self-timer photographing standby time is completed (S57).

As a result of the determination, if counting of the self-timer photographing standby time is completed, the DSP 200 performs self-timer photographing (S58) and displays a photographing result on the display unit 160.

Figure 17:
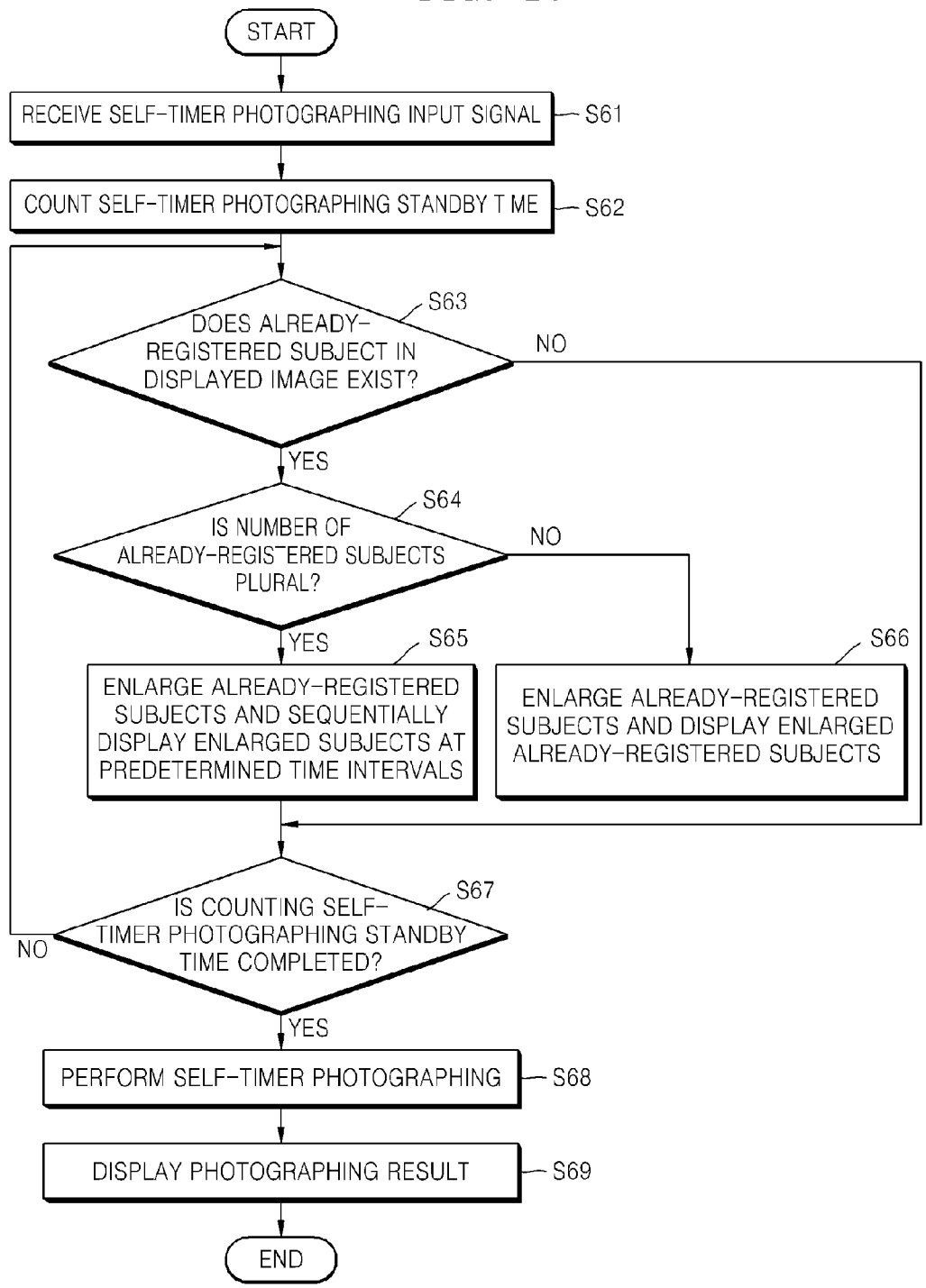

FIG. 17 is a flowchart illustrating a method of controlling a digital photographing apparatus, according to another embodiment of the invention. Hereinafter, repeated descriptions with reference to FIGS. 13 through 16 are omitted.

Referring to FIG. 17, the DSP 200 receives a self-timer photographing input signal from a user (S61).

When the self-timer photographing input signal is received from the user, the DSP 200 counts a self-timer photographing standby time (S62).

By counting the self-timer photographing standby time, the DSP 200 determines whether at least one already-registered subject exists in the displayed input image (S63).

As a result of the determination, if at least one already-registered subject exists in the displayed input image, the DSP 200 determines whether the number of already-registered subjects is plural (S64).

When the number of already-registered subjects is plural, the DSP 200 enlarges the already-registered subjects and displays the enlarged already-registered subjects on the display unit 160 sequentially at predetermined time intervals (S65). If enlargement and display of the already-registered subject is completed, the DSP 200 displays the whole image to be captured and repeatedly performs enlargement and display of the already-registered subject and display of the whole image for the self-timer photographing standby time.

Otherwise, if the number of already-registered subjects is one, the DSP 200 enlarges the already-registered subjects and displays the enlarged already-registered subjects on the display unit 160 (S66). The DSP 200 repeatedly performs enlargement and display of the already-registered subject and display of the whole image to be captured at predetermined time intervals.

While enlarging and displaying, the DSP 200 determines whether counting of the self-timer photographing standby time is completed (S67).

As a result of the determination, if counting the self-timer photographing standby time is completed, the DSP 200 performs self-timer photographing (S68) and displays a photographing result on the display unit 160 (S69).

Figure 18:
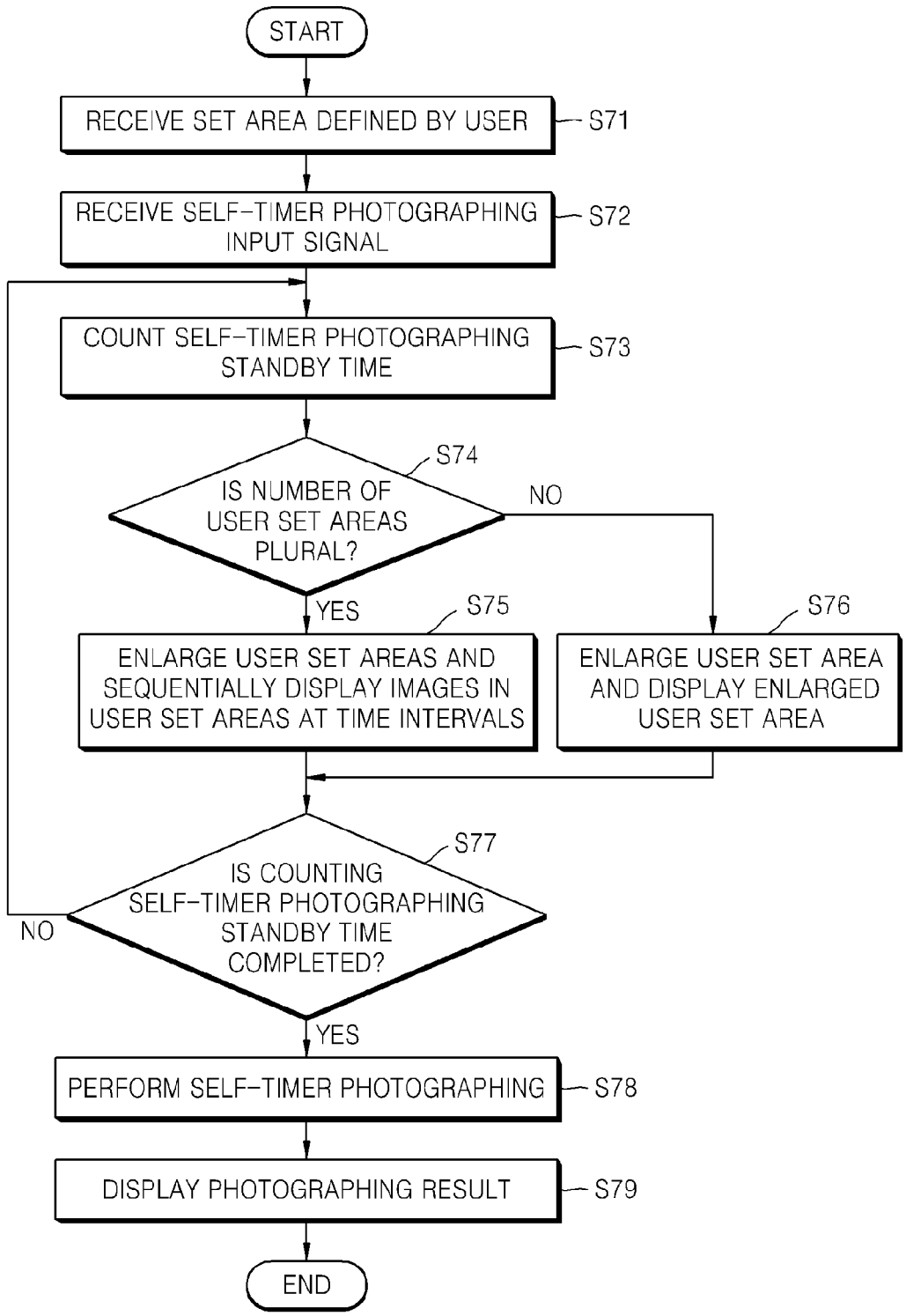

FIG. 18 is a flowchart illustrating a method of controlling a digital photographing apparatus, according to another embodiment of the invention. Hereinafter, repeated descriptions with reference to FIGS. 13 through 17 are omitted.

Referring to FIG. 18, the DSP 200 receives a set area defined by a user from the user (S71). The user sets at least one arbitrary area of the display unit 160 to be enlarged, and the DSP 200 stores coordinates of the area set by the user.

Next, the DSP 200 receives a self-timer photographing input signal from the user (S72).

When the self-timer photographing input signal is received from the user, the DSP 200 counts the self-timer photographing standby time (S73).

By counting the self-timer photographing standby time, the DSP 200 determines whether the number of user set areas in the displayed input image is plural (S74).

As a result of the determination, if the number of user set areas is plural, the DSP 200 enlarges the user set areas and displays images in the enlarged user set areas on the display unit 160 sequentially at predetermined time intervals (S75). If enlargement and display of the user set areas is completed, the DSP 200 displays the whole image to be captured and then repeatedly performs enlargement and display of the user set areas and display of the whole image for the self-timer photographing standby time.

Otherwise, if the number of user set areas is one, the DSP 200 enlarges the user set area and displays the enlarged user set area on the display unit 160 (S76). The DSP 200 performs enlargement and display of the user set areas and display of the whole image to be captured at predetermined time intervals.

While enlarging and displaying, the DSP 200 determines whether counting of the self-timer photographing standby time is completed (S77).

As a result of the determination, if counting of the self-timer photographing standby time is completed, the DSP 200 performs self-timer photographing (S78) and displays a photographing result on the display unit 160 (S79).

As described above, according to the one or more embodiments of the invention, an area of a subject to be photographed is enlarged and displayed for the self-timer photographing standby time so that a photographing state of the subject to be photographed may be checked and a desired image may be captured.

The invention can also be embodied as computer-readable codes on a computer-readable recording medium. The computer-readable recording medium is any data storage device that can store data which can be thereafter read by a computer system.

Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the invention can be easily construed by programmers skilled in the art to which the invention pertains.

While this invention has been particularly shown and described with reference to preferred embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the invention.

All references, including publications, patent applications, and patents, cited herein are hereby incorporated by reference to the same extent as if each reference were individually and specifically indicated to be incorporated by reference and were set forth in its entirety herein.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A method of controlling a digital photographing apparatus, the method comprising:
    receiving a self-timer photographing input signal;
    enlarging and displaying one area of a displayed input image during a self-timer photographing standby time comprising:
        detecting at least two face areas from the input image;
        setting priorities for enlargement and display to the detected face areas by:
            setting a face of a first state as a first priority;
            setting a face, of which a part deviates from a display region, as a second priority; and
            setting a face of a third state as a third priority; and
        enlarging the at least two detected face areas and sequentially displaying the enlarged face areas at predetermined time intervals; and
    capturing the displayed input image after the self-timer photographing standby time elapses.

2. The method of claim 1, wherein the input image is displayed to face a subject to be photographed.

3. The method of claim 1, wherein the enlarging and displaying comprises enlarging and displaying a face area recognized in the input image.

4. The method of claim 1, wherein the setting priorities further comprises maintaining a current enlarged image until the face of the first state changes into a face of a second state, and if the face of the first state changes into the face of the second state, enlarging and displaying a next face.

5. The method of claim 1, wherein the setting priorities further comprises maintaining a current enlarged image until a whole face, of which a part deviates from the display region, is included in the display region, and if the whole face, of which a part deviates from the display region, is included in the display region, enlarging and displaying a next face.

6. The method of claim 1, wherein, if the enlarging and displaying the at least two detected face areas is completed, the enlarging and displaying further comprises displaying a whole image to be captured by using a self-timer and repeatedly performing the enlarging and displaying.

7. The method of claim 1, wherein the enlarging and displaying comprises enlarging and displaying an auto-focusing (AF) area in the input image.

8. The method of claim 1, wherein the enlarging and displaying comprises enlarging and displaying an already-registered subject in the input image.

9. The method of claim 1, wherein the enlarging and displaying comprises enlarging and displaying a set area of the input image defined by the user.

10. The method of claim 1, further comprising, after the capturing the displayed input image, displaying a self-timer photographing result.

11. A digital photographing apparatus comprising:
    an imaging device for receiving light from a subject to be photographed and generating an input image;
    a display unit for displaying the input image; and
    a digital signal processor (DSP) for enlarging and displaying one area of the input image displayed on the display unit during a self-timer photographing standby time when a self-timer photographing input signal is received, and capturing the displayed input image if the self-timer photographing standby time elapses, wherein the enlarging and displaying comprises:
  detecting at least two face areas from the input image;
  setting priorities for enlargement and display to the detected face areas by:
    setting a face of a first state as a first priority;
    setting a face, of which a part deviates from a display region, as a second priority; and
    setting a face of a third state as a third priority; and
  enlarging the at least two detected face areas and sequentially displaying the enlarged face areas at predetermined time intervals.

12. The digital photographing apparatus of claim 11, wherein the display unit is disposed to face the subject to be photographed.

13. The digital photographing apparatus of claim 11, wherein the DSP enlarges and displays a face area recognized in the input image.

14. The digital photographing apparatus of claim 11, wherein the DSP enlarges and displays an auto-focusing (AF) area of the input image.

15. The digital photographing apparatus of claim 11, wherein the DSP enlarges and displays an already-registered subject in the input image.

16. The digital photographing apparatus of claim 11, wherein the DSP enlarges and displays a set area of the input image defined by the user.

17. The digital photographing apparatus of claim 11, wherein the DSP comprises:
  a timer for counting the self-timer photographing standby time;
  an area setting unit for setting an arbitrary area of the displayed input image;
  an enlargement unit for enlarging the set area; and
  a control unit for sequentially displaying the enlarged area.

* * * * *